No. 757,001. PATENTED APR. 12, 1904.
W. N. WHITELY.
GRAIN HARVESTING MACHINE.
APPLICATION FILED JUNE 3, 1901.
NO MODEL. 3 SHEETS—SHEET 1.

Fig 1.

Fig. 2.

WITNESSES:
John L. Gilligan
William L. O'Brien

INVENTOR.
William N. Whitely

No. 757,001. PATENTED APR. 12, 1904.
W. N. WHITELY.
GRAIN HARVESTING MACHINE.
APPLICATION FILED JUNE 3, 1901.
NO MODEL. 3 SHEETS—SHEET 2.
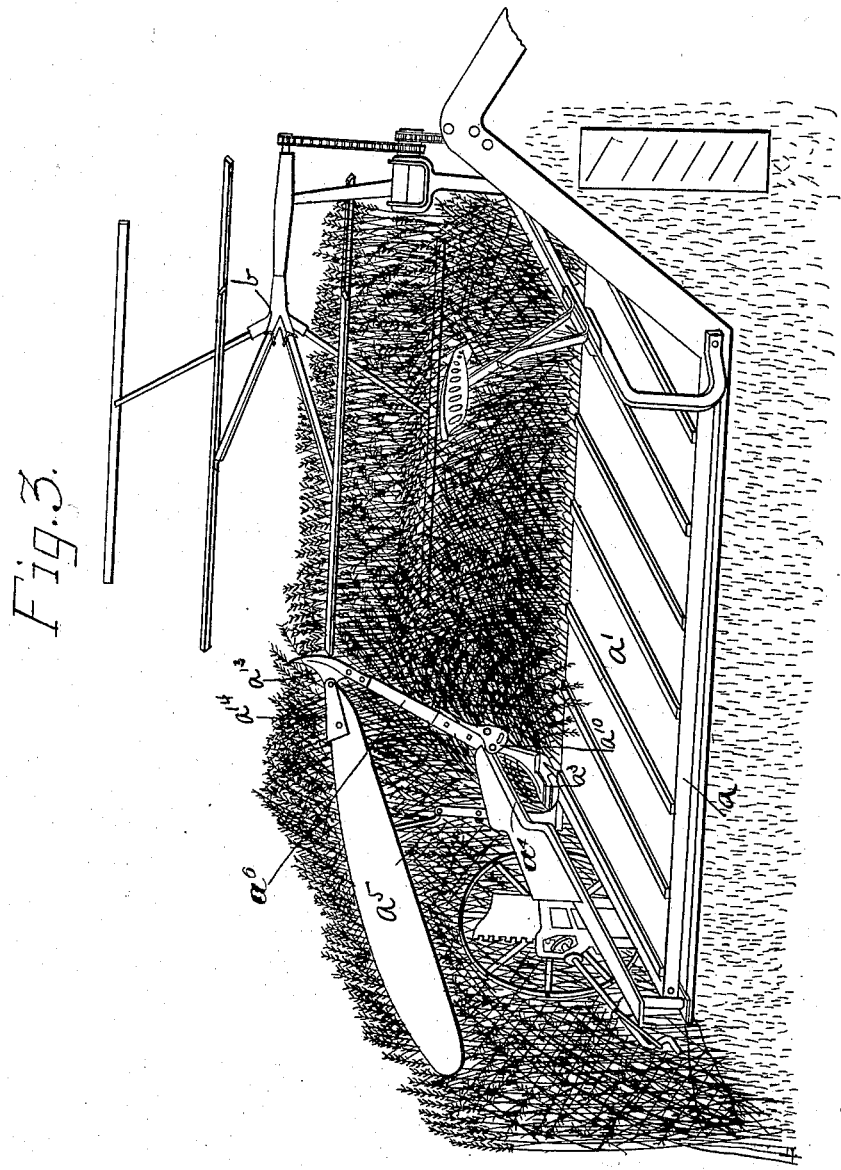

No. 757,001. PATENTED APR. 12, 1904.
W. N. WHITELY.
GRAIN HARVESTING MACHINE.
APPLICATION FILED JUNE 3, 1901.
NO MODEL. 3 SHEETS—SHEET 3.
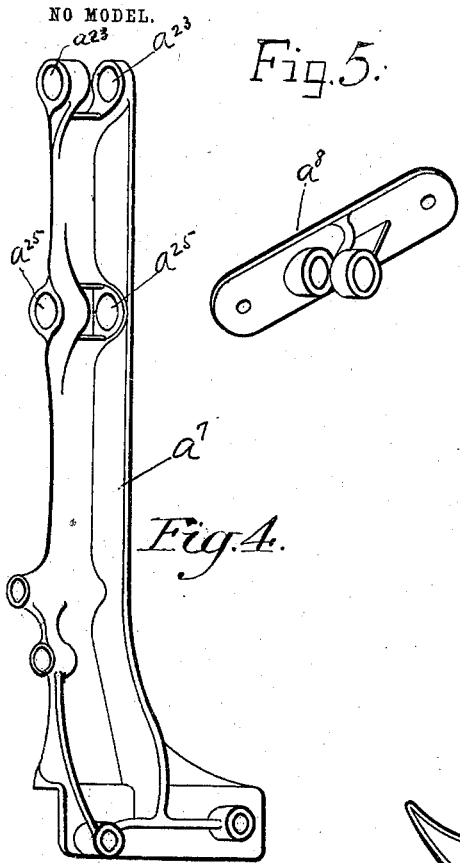
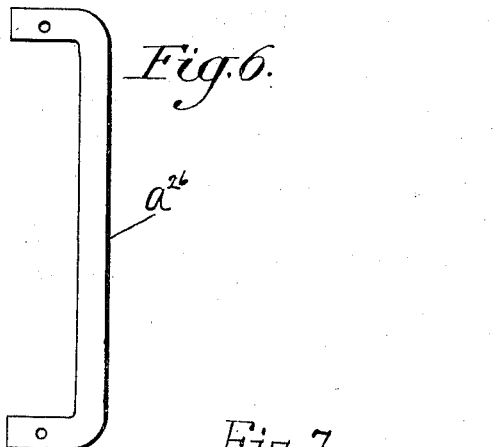
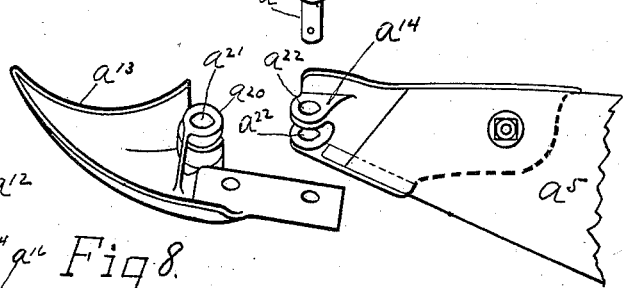
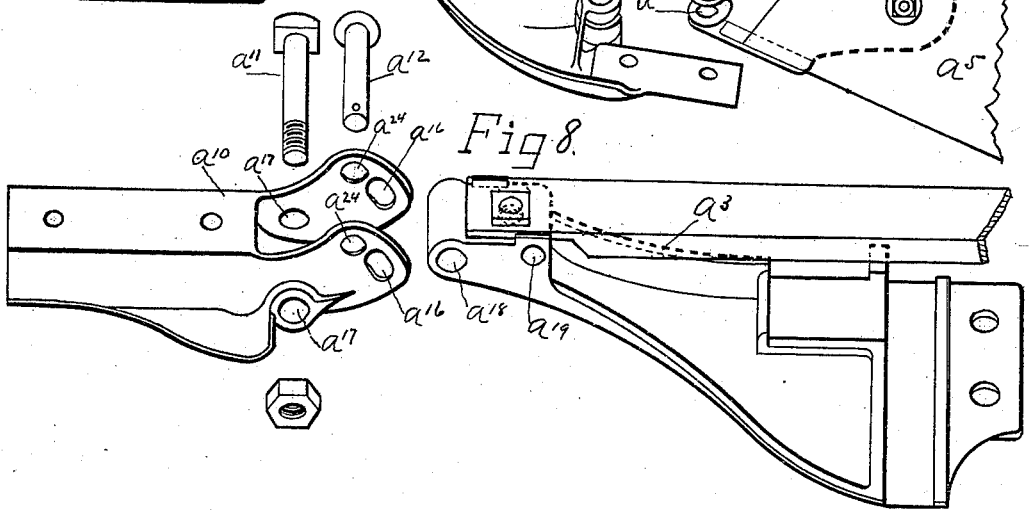
WITNESSES:
John L. Gilligan
William L. O'Brien
INVENTOR.
William N. Whitely No. 757,001. Patented April 12, 1904.

UNITED STATES PATENT OFFICE.

WILLIAM N. WHITELY, OF SPRINGFIELD, OHIO.

GRAIN-HARVESTING MACHINE.

SPECIFICATION forming part of Letters Patent No. 757,001, dated April 12, 1904.

Application filed June 3, 1901. Serial No. 62,997. (No model.)

*To all whom it may concern:*

Be it known that I, WILLIAM N. WHITELY, a citizen of the United States, residing at No. 153 East High street, Springfield, in the county of Clark and State of Ohio, have invented certain new and useful Improvements in Grain-Harvesting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in grain-harvesting machines.

One object of my invention is to provide a grain-harvester employing a two-part grain-divider located at the forward outer end of the platform and finger-bar which is vertically adjustable to pass over the grain and to coöperate with the finger-bar in separating tangled and entwined grain at the grainward end of the machine into swaths, each swath by itself by cutting them apart.

Another object of my invention consists in making said divider, its front portion free to adjust itself over the ground, the free end of the divider inclined upwardly sufficiently to glide over the undulating ground and self-adjust itself over the ground for the purpose of separating the grain to be cut from that to be left standing and follow the ground closely whatever the angle or pitch of the machine forward or backward may be, the forward portion of the divider being free to rise and fall within certain limits for this purpose, the rearward end of the cap portion of the divider yieldingly supported in rear of its lower hinged joint and above said joint that the cap portion of the divider may occupy its proper grain-separating position.

Another object of my invention is that the divider may be folded upward and rearward when desired to economize space for transportation or storage or when the machine is operating in grain that is down, tangled, or matted together by entwining vines which would be impossible to separate one swath from another by the grain-dividers now employed; that my improved grain-divider may be folded upward and rearward to pass over the matted and tangled grain and bear it down at the grainward end of the machine, the cutters passing into and under the grain, severing the stalks, and making a complete separation of the cut swath from the standing grain.

In harvesting grain it frequently occurs that the straw is broken, twisted, lodged, tangled, and lying close to the ground and badly interwoven, and in addition running vines entwine the grain, matting it together to such an extent that it cannot be successfully separated by the devices now employed for that purpose and cut each swath by itself. Consequently what is known as the "divider" or "grain-dividing" mechanism located at the outer end of the finger-bar will be clogged by reason of the matted, tangled, and twisted grain contacting with said divider on the top portion thereof by the forward motion of the machine, and the reeling mechanism coming in contact with the matted, tangled, twisted, and interwoven grain overhanging the divider will be broken. In case the divider can be forced by the forward motion of the machine through the matted tangled grain the cut swath will be held by the uncut grain, at the heads thereof, and the platform of the machine pass under it and the cut swath left behind in the wake of the machine. Numerous efforts have been made to overcome these difficulties with grain-harvesters when cutting lodged, matted, tangled, or down grain; but they were impractical and of little avail, and the trouble still existed prior to my invention and to such an extent that badly tangled, matted, twisted, and lodged grain could not be satisfactorily harvested and saved. To overcome this difficulty, I make a two-part grain-divider located at the outer end of the platform and forward of the finger-bar and pivotally connected to the divider-frame. The forward part of the divider may be adjusted to the ordinary position when harvesting grain that is standing and can be easily separated, its point being near the ground; but the divider is so constructed that it may be turned upward when desired, the point of the divider in this position passing over the lodged tangled twisted grain, allowing the grain to pass freely under the divider toward the finger-bar, the points of the guard-fingers being tilted close to the ground, the guard-fingers and cutters penetrating the grain near the ground and severing the stalks in the swath and also cutting the swath apart from the standing grain, the hinged connection of the divider being preferably forward of the line of the points of the guard-fingers, so that when the cutters are tilted down the guard-fingers will pass close to the ground under the lodged matted tangled grain lying on the ground, severing the stalks close to the ground, while the point of the divider extends over and above the lodged grain like a runner, and by the forward motion of the machine the grain is forced under the divider and against the finger-bar and knife, making a complete separation between the grain to be cut and the grain to be left standing. Consequently there is no choking or clogging of the grain at the divider or on the platform.

My improved two-part grain-divider, it will be observed from the above, has three special objects; but the one I regard as the most important is the separation and cutting apart of lodged, tangled, matted, and entwining grain that each swath may be easily separated from the standing grain and be elevated and bound, and, so far as I am aware, this has never before been accomplished. I attain these objects by the mechanism illustrated in the accompanying drawings, in which—

Figure 1 is an end view of a portion of a grain-harvester sufficient to illustrate my improvements, the dark lines showing the position of my improved adjustable two-part grain-divider following the ground closely when cutting standing grain, the dotted lines showing the position of my improved adjustable two-part grain-divider when operating in lodged, matted, or tangled grain, the point above the grain and the divider passing entirely over the grain. The dotted lines also show the position of my improved divider when ready for trucking, this position being one in which the machine may pass through narrow gateways or passages because of the smaller space occupied by the machine with the divider so placed. Fig. 2 is an end view of the outer or grainward portion of a harvester-platform, showing my improved adjustable two-part grain-divider passing over hillocks or other obstructions of the ground. Fig. 3 is a rear perspective view of a portion of a grain-harvester cutting in lodged matted tangled grain, showing my improved two-part grain-divider, the forward part turned upward passing over the tangled grain, pressing and holding the tangled grain down while the stalks are severed by the cutting apparatus. Fig. 4 is a detail perspective view showing the pivotal bracket-support from the rail of the divider-frame to the pivotal link supporting the divider-cap. Fig. 5 is a perspective view of one of the socket-supports for the divider-cap. Fig. 6 is a detail view of the pivotal link connection between the bracket $a^7$ and the divider-cap. Fig. 7 is a perspective detail view of the divider-point and its pivotal hinge connection to the divider-cap. Fig. 8 is a detail perspective view of the outer shoe of the finger-bar, also the pivotal hinge of the divider-rail and the manner of connecting said rail and shoe together.

Similar letters of reference refer to similar parts throughout the several views.

$a$ represents the binder-platform. $a'$ represents the horizontal grain-conveying belt supported by said platform.

$a^2$ represents the finger-bar. $a^3$ represents the outer shoe rigidly secured to said finger-bar and to the forward end of the rail $a^6$ of the divider-frame. Fig. 1, $a^4$ represents the rail of the divider-frame, which extends forward of the cutters and forms a rigid support for the forward end of the shoe $a^3$ of the divider-frame; $a^5$, the adjustable divider-cap at the grainward end of the machine; $a^6$, the divider-rail; $a^7$, the bracket rigidly secured to the finger-bar $a^2$, forming a support from the finger-bar to the divider-cap; $b$, the reeling mechanism; $b'$ the lower elevator-belt; $b^2$, the upper elevator-belt.

What I term the "divider-frame" consists of the divider-rail $a^4$ and shoe $a^3$, said shoe rigidly connected to the forward end of said rail, said rail and shoe rigidly connected to the grainward end of the platform and finger-bar, forming a frame for the pivotal support for my improved divider.

In the construction shown I employ the usual reeling mechanism $b$, grain-platform $a$ for the support and protection of the horizontal grain-conveying belt $a'$, and finger-bar $a^2$. To the grainward end of the finger-bar $a^2$ is rigidly secured the shoe $a^3$. On the forward portion of said shoe $a^3$ is formed one portion of the pivotal hinge connection, which projects forward and extends into a hinged joint $a^{10}$, which is rigidly secured to the rear end of the divider-rail $a^6$. This hinge-joint connects the rearward end of the part $a^6$ and the forward end of the shoe $a^3$ together. The two portions of the pivotal hinge-joint are connected and held in working position by the pin $a^{11}$ passing through the holes $a^{17}\ a^{17}$ in the pivotal-hinge portion $a^{10}$ and through the hole $a^{18}$ of the pivotal hinge portion on the forward part of the shoe $a^3$, the pin $a^{12}$ passing through the holes $a^{16}\ a^{16}$ in the rearward part of the forward hinge portion $a^{10}$ and through the hole $a^{19}$ of the pivotal hinge portion on the forward part of the shoe $a^3$, the holes $a^{16}\ a^{16}$ being elongated, as shown in Fig. 8, to allow the divider to rise upwardly and rearwardly to pass over obstructions and to accommodate itself to the inequalities of the ground and limit its movement. While the shoe $a^3$ may be connected to the outer end of the finger-bar in any manner desired, I prefer to connect it to the under side thereof.

To the outer end of the forward portion of the divider-rail $a^6$ of the grain-divider is rigidly secured a divider-point $a^{13}$, so formed as to pass easily over the ground and through the uncut grain. On the rearward part of said divider-point $a^{13}$ is formed one portion of a pivotal hinge connection $a^{20}$. (Shown in detail in Fig. 7.) On the forward part of the divider-cap $a^5$ is secured another portion, $a^{14}$, of said pivotal hinge, the two portions of said hinge being pivotally connected and held together by the pin $a^{15}$ passing through the hole $a^{21}$ of the pivotal hinge portion $a^{20}$ of the divider-point $a^{13}$ and through the holes $a^{22}$ $a^{22}$ of the pivotal hinge portion $a^{14}$.

When harvesting straight standing grain and it is desired to have the grain-divider follow the ground, the lower end of the vibrating pivotal link $a^{26}$ is pivotally connected to the bracket-support $a^7$ by the lower end of said link passing through the holes $a^{25}$ $a^{25}$ of the bracket-support $a^7$ and held in place by a cotter, the upper end of said link $a^{26}$ pivotally connected to the socket $a^8$, which is rigidly secured to the under side of the divider-cap $a^5$. When harvesting lodged, tangled, and entwining grain and it is desired to operate the harvester with the grain-divider inclined upwardly and rearwardly, as indicated by dotted lines in Fig. 1, the forward portion of the grain-divider is raised upwardly, pivoting on the pin $a''$ until the holes $a^{24}$ $a^{24}$ in the forward portion of the pivotal hinge connection $a^{10}$ coincide with the hole $a^{19}$ in the rigid portion of the pivotal hinge connection on the forward portion of the shoe $a^3$, the divider being held in this inclined position by the pin $a^{12}$ passing through the holes $a^{24}$ $a^{24}$ in the forward portion of the pivotal hinge $a^{10}$ and $a^{19}$ of the pivotal hinge portion on the forward end of the shoe $a^3$. When the divider is in this inclined position, the lower end of the vibrating pivotal link $a^{26}$ passes through the holes $a^{23}$ $a^{23}$ of the bracket-support $a^7$, which is secured to the finger-bar and is held in position by a cotter, the upper end of said vibrating pivotal link pivotally connected to the socket $a^9$, rigidly secured to the under side of the divider-cap and forward of the socket $a^8$. The above position is also the one in which the divider is placed for trucking.

The pivotal joint by which the divider-rail $a^6$ is pivotally connected to the rail of the divider-frame and to the shoe $a^3$ is located, preferably, forward of the line of the points of the guard-fingers, so that when cutting lodged matted tangled grain and the forward portion of the grain-divider is raised from the ground and the divider standing in an inclined position the platform and finger-bar can be tilted so that the guards will be close to the ground and extend into and under the grain, the knife severing the stalks of the grain as it is forced down to it by the forward portion of the grain-divider passing over it.

My improvements are new and of great value and importance to grain-harvesting machines and to the users thereof, as by means of them very serious troubles with grain-harvesting machines are overcome and much time, labor, and annoyance saved the operator.

What I claim, and desire to secure by Letters Patent, is—

1. In a grain-harvesting machine, in combination, a finger-bar, a grain-conveying belt, a supporting-platform for said belt, a grain-divider located at the grainward end of said platform, a divider-frame connected to said platform and to said finger-bar one member of said divider consisting of a rail pivotally connected to said divider-frame, another member of said divider consisting of a cap extending forward into the standing grain and pivotally connected at its forward end with said rail, said divider-cap inclining from its point upward and rearward, a pivotal link supporting said divider-cap, supporting means from said finger-bar for said link, means for maintaining said divider in its elevated positions.

2. In a grain-harvesting machine, in combination, a finger-bar, a grain-divider located at the grainward end of the platform and finger-bar, a divider-frame connected to said platform and to said finger-bar, one member of said divider consisting of a rail projecting in advance of the cutters, and pivotally connected in front of the cutters to a member of the divider-frame, another member of said divider consisting of a cap pivotally connected at its forward end to said rail, an upwardly-projecting link pivotally connecting with said divider-cap supporting means from said finger-bar for said link.

3. In a grain-harvesting machine, in combination, a finger-bar, a horizontal grain-conveying belt, a platform for the support and protection of said belt, a grain-divider located at the grainward end of said platform and said finger-bar, a rail member $a^6$ of said divider extending forward in advance of the cutters, a member $a^4$ of the divider-frame and a shoe $a^3$, said parts rigidly connected to said platform and finger-bar and projecting forward of the cutters, forming a pivotal support for said rail $a^6$, another member of said divider consisting of a cap pivotally connected to the forward end of said pivoted rail $a^6$, supporting means from said finger-bar for the rearward end of said cap, a stop device independent of the pivot for the rail $a^6$ to limit said rail and divider-cap in vertical movement while their forward ends are free to follow the undulations of the ground.

4. In a grain-harvesting machine, in combination, a finger-bar, a grain-divider located at the grainward end of the platform, a divider-frame connected to said platform and finger-bar, one member of said frame consisting of a rail extending across the platform, another member of said divider-frame consisting of a shoe rigidly connected to said rail and to said finger-bar, one member of said divider consisting of a rail projecting forward into the grain and pivotally connected in advance of the cutters to said divider-frame, another member of said divider consisting of a cap, a pivotal connection between said rail and said cap near their forward ends whereby said divider may be elevated into a folded position, a locking means between said divider-rail and platform-rail of said divider-frame for holding said divider in a folded position.

5. In a grain-harvesting machine, in combination, a finger-bar, a grain-conveying belt, a platform to support said belt, a grain-divider located at the grainward end of said platform, a divider-frame located at the grainward end of said platform and finger-bar, one member of said frame extending across and secured to the grain-receiving platform, a shoe member of said frame connected to the finger-bar and extending upward and forward and joined with the first-mentioned member of said frame in front of the cutters, one member of said divider consisting of a rail pivotally connected to the forward end of said divider-frame in front of the cutters, a stop between said rail and said divider-frame to limit said rail in its vertical movements, another member of said divider consisting of a cap, its forward end pivotally connected to and supported by said rail, said divider-cap extending upward and rearward from its pivotal connection with said rail, flexible supporting means from said finger-bar for the rearward end of said cap all for the purpose of forming a floating grain-divider to conform to the undulations of the ground.

6. In a grain-harvesting machine, in combination, a grain-conveying belt, a platform to support said belt, a finger-bar, a divider-frame located at the grainward end of said platform and finger-bar, one member of said frame extending lengthwise across the width of said platform and secured thereto and extending forward of the cutters, a shoe member of said frame connected to the finger-bar and extending forward and upward and connecting with the upper member of said divider-frame, a rail extending forward into the grain in advance of the cutters, its rear end pivotally connected with said shoe, a divider-cap pivotally connected at its forward end to said rail, an upward-projecting support from said finger-bar, and pivotally connected to said divider-cap to hold said divider-cap in working position.

7. In a grain-harvesting machine, in combination, a grain-receiving platform, a grain-divider at the grainward end of said platform, a divider-frame located at and secured to the grainward end of said platform, one member of said divider consisting of a rail projecting in advance of the cutters and pivotally connected with a member of the divider-frame forward of the cutters, another member of said divider consisting of a cap pivotally connected at its forward end with the forward end of said rail, a supporting means for holding said divider-cap and said rail in an elevated position for transporting through narrow ways.

8. In a harvesting-machine, in combination, a horizontal grain-conveying belt, a finger-bar, a platform to support said grain-conveying belt, a divider-frame secured to the grainward end of said finger-bar and platform, a divider-rail extending forward in advance of the cutters and pivotally connected with a member of said divider-frame forward of the cutters, a divider-cap pivotally connected to the forward end of said rail, means for holding said divider-rail in a semi-elevated position to pass over the uncut grain and guide it under the cutters without dividing it, the cutters acting to cut the swath free from the standing grain.

9. In a grain-harvesting machine, in combination, a platform, a finger-bar, a divider-frame secured to the grainward end of said platform and finger-bar, a grain-divider located at the grainward end of said platform, one member thereof consisting of a rail projecting forward in advance of the cutters into the uncut grain and forming the lower part of said divider, a rail member of said divider-frame extending across said platform and pivotally supporting said divider-rail, another member of said divider consisting of a cap, its forward end pivotally connected with said rail, a link pivotally connecting to said divider-cap, supporting means from said finger-bar for said link, a pivotal connection between said rail and said divider-frame that will allow vertical movement within fixed limits of the forward end of said divider in passing over the ground, said rail and divider-cap held against sidewise movement by said pivotal-joint connection between said divider and said divider-frame.

In testimony whereof I affix my signature in presence of two witnesses.

WILLIAM N. WHITELY.

Witnesses:
   JOHN L. GILLIGAN,
   WILLIAM L. O'BRIEN.